US008057587B2

(12) United States Patent
Beeck et al.

(10) Patent No.: US 8,057,587 B2
(45) Date of Patent: Nov. 15, 2011

(54) COMPOSITION FOR COLORING SOLDER

(76) Inventors: Michael Beeck, Somerville, NJ (US); Lance Getic, Bloomfield, NJ (US)

( * ) Notice: Subject to any disclaimer, the term of this patent is extended or adjusted under 35 U.S.C. 154(b) by 399 days.

(21) Appl. No.: 12/436,162

(22) Filed: May 6, 2009

(65) Prior Publication Data
US 2009/0280254 A1 Nov. 12, 2009

Related U.S. Application Data

(60) Provisional application No. 61/127,309, filed on May 12, 2008.

(51) Int. Cl.
*C09D 11/00* (2006.01)
(52) U.S. Cl. .................. 106/1.13; 106/1.26; 252/385
(58) Field of Classification Search .............. 106/1.13, 106/1.26; 252/385
See application file for complete search history.

(56) References Cited

U.S. PATENT DOCUMENTS

| 2,564,756 | A | | 8/1951 | Gessler |
| 2,915,414 | A | | 12/1959 | Hilemn |
| 3,930,898 | A | | 1/1976 | Cooley |
| 4,631,093 | A | | 12/1986 | Etemovich |
| 4,975,159 | A | * | 12/1990 | Dahms ........................ 205/125 |
| 5,160,381 | A | | 11/1992 | Gervias |
| 5,282,890 | A | | 2/1994 | Protzer et al. |
| 5,650,014 | A | | 7/1997 | Tauber |
| 6,712,262 | B2 | * | 3/2004 | Akaike et al. ................. 228/207 |
| 7,393,395 | B2 | * | 7/2008 | Aiba et al. ................. 106/14.16 |
| 2002/0018844 | A1 | * | 2/2002 | Kitajima et al. ................ 427/58 |
| 2008/0230263 | A1 | * | 9/2008 | En ................................. 174/262 |
| 2011/0042201 | A1 | * | 2/2011 | Von Gutfeld et al. ......... 204/200 |
| 2011/0088932 | A1 | * | 4/2011 | Ebe ................................ 174/257 |

* cited by examiner

*Primary Examiner* — Gregory Webb
(74) *Attorney, Agent, or Firm* — Baker & Rannells, PA

(57) ABSTRACT

A method of coloring solder is provided. The method includes providing an aqueous coloring agent solution essentially containing 31-32% wt of copper sulfate, 64-65% wt of water and 3-4% wt of salt and an anti-caking agent, drying a solder seam with a dry cloth to remove excess flux, applying the aqueous coloring agent solution directly onto the solder seam; and wiping away excess amounts of the aqueous coloring agent solution with a second dry cloth.

6 Claims, No Drawings

COMPOSITION FOR COLORING SOLDER

CROSS REFERENCE TO RELATED APPLICATION

This application is a continuation-in-part of prior provisional application Ser. No. 61/127,309, filed on May 12, 2008. The above listed application is incorporated herein by reference in its entirety.

FIELD OF THE INVENTION

The present invention relates to a method for coloring solder to a desired tone. More specifically, the present invention relates to a method of providing a coloring agent and applying it to a soldered seam to impart an ornamental antique brown color solder that is used primarily between copper roofing plates.

BACKGROUND OF THE INVENTION

Solder is a commonly produced as alloy of tin and lead. It melts around 300 degrees and is applied with a soldering gun to seams to fasten materials together including metal parts. It adheres to a variety of metals including silver, copper, and lead. Electronic circuits use solder to attach the individual components to a printed copper pattern on the circuit board. Plumbers use solder to seal copper pipes together. Likewise, metal construction workers use solder to seal and attach together metal plates.

Copper shingles are a durable, cost-effective method of roofing. Copper is also frequently used for the construction of bay windows. Individual copper pieces must be soldered together using traditional solders for sealing and joining the pieces. After liquefied solder hardens, it retains a gun metal gray color. However, a copper roof panel retains a brown color for approximately 70% of its usable life. Many owners are dissatisfied by the resulting and starkly contrasting difference in color between new copper roof panels and the gray solder seams.

There has long been a need in the copper roofing and copper plate industry for a process to inexpensively and to easily add a coloring agent to solder substrate that is applied to surfaces subject to ambient weather conditions. While many patinas exist to impart a copper tone onto non-copper, metal plate substrates, patinas are ineffective for permanently and easily coloring solder.

SUMMARY OF THE INVENTION

The present invention overcomes the disadvantages and shortcomings of the problems of the prior art by providing a method of manufacturing and applying a solder coloring agent that achieves a desired color, is easily applied, and is resistant to outdoor conditions. In the exemplary embodiment of the invention, a solder seam is colored using a coloring agent in a liquid solution that is applied directly onto solder seams in the outdoors. In the exemplary embodiment of the invention, the copper color is achieved by directly applying a solution of water, a copper chlorate flake, potassium iodide, salt, sodium aluminosilicate and dextrose onto a soldered seam that has been previously applied between copper plates or shingles.

DETAILED DESCRIPTION OF THE EXEMPLARY EMBODIMENTS

The present invention provides a method to add a decorative color to a gray soldered seam to match the color of copper plates. The process of the invention generally involves three steps. First, the aqueous solution is formulated and stored in bottles with squeeze tip applicators. Then, after solder has been applied to join copper plates, the seam is cleaned with a dry cloth to ensure that it is free of flux residue. Next, the aqueous solution of the present invention is applied to the seam by squeezing out a thin fluid line over the top of the soldered seam. Finally, the colored seam is wiped down with another dry cloth to remove excess liquid. The seam changes color almost on contact with the solution of the present invention.

In order to further illustrate the present invention, the following example is provided. It will be understood that the example provided is for illustrative purposes only and is not intended to limit the scope of the invention as herein disclosed and as set forth in the claims.

Except as otherwise noted, the following example yielded an antique brown appearance on the surface of the solder substrate. The preparation of the solution was done at room temperature, and the application onto the solder substrate was done at ambient outdoor conditions above 40 degrees Fahrenheit air temperature.

Example

| Ingredient | % by Weight |
| --- | --- |
| Copper Sulfate | 31.5% |
| Purified Water | 64.1% |
| Sodium Chloride | 3.8% |
| Potassium Iodide | 0.05% |
| Dextrose | 0.04% |
| Sodium Aluminosilicate | 0.5% |

The solution of the present invention is comprised substantially of water, copper flakes in the form of copper sulfate, salts and sugar. In its resultant solution, the copper sulfate reacts with the salts to produce copper chloride which imparts the antique brown color to the top layer of the solder substrate.

Additionally, the composition of the present invention is meant to be applied to solder that is used as a sealant for outdoor copper roof shingles or on outdoor copper plates used for the exterior facade of bay windows. The solution of the present invention uses Potassium Iodide and common sodium chloride salt to reduce the freezing point of the solution to 29 degrees Fahrenheit. This allows the solution to be shipped in temperatures below 32 degrees without solidifying.

Dextrose is added to the solution to prevent the Potassium Iodide from decomposing into Potassium and Iodine. Potassium Iodide is an ionic compound dissolves into its constituent components when dissolved in water. Potassium Iodide dissociates into ions, and in the case of potassium iodide, into $K^+$ and $I^-$ ions. These ions are mobile in the aqueous solution. Dextrose is introduced into the solution to prevent the Potassium Iodide from breaking down into Iodine, which evaporates away (sublimes).

The composition of the present invention includes a trace amount of sodium aluminosilicate. This compound is a well known anti-caking agent added to the solution to prevent the dextrose and the salts from sticking together. Because salts are hygroscopic, they absorb water from the air, winch dissolve the salts. The resulting salt water combines with the remaining salts, cementing the grains together into a solid mass. Sodium aluminosilicate absorbs moisture from the air in a greater amount than the salts in the composition of the present invention, and does not dissolve in the water it absorbs. This protects the salts from caking.

A particular advantage of the present invention is its ease of application. The user simply squeezes out a layer of liquid solution onto the soldered seam from the nozzle tip of the bottle in which the product in stored and slipped. After application, the user wipes off any excess that may drip therefrom. Upon contact, the gray solder almost instantly begins to acquire an antique brown color that closely resembles the color of the copper plates or shingles. While on a roof, ease of application is essential to safety and to improving the speed at which the task can be accomplished.

We claim:

1. An aqueous coloring agent solution consisting essentially of 31-32% wt of copper sulfate, 63-64% wt of water, 3-4% wt of salt and an anti-caking agent.

2. The aqueous coloring agent solution of claim 1 wherein said salt is sodium chloride.

3. The aqueous coloring agent solution of claim 2 wherein said salt is comprised of 0.04-0.06% wt potassium iodide.

4. The aqueous coloring agent solution of claim 1 wherein said anti-caking agent is sodium aluminosilicate.

5. The aqueous coloring agent solution of claim 1 wherein said coloring agent includes 0.03-0.05% wt sugar.

6. The aqueous coloring agent solution to claim 5 wherein said sugar is dextrose.

* * * * *